Dec. 14, 1937.  G. E. JONSSON  2,101,946
CENTRIFUGAL CLUTCH FOR ROTATING MACHINE ELEMENTS
Filed Aug. 20, 1935
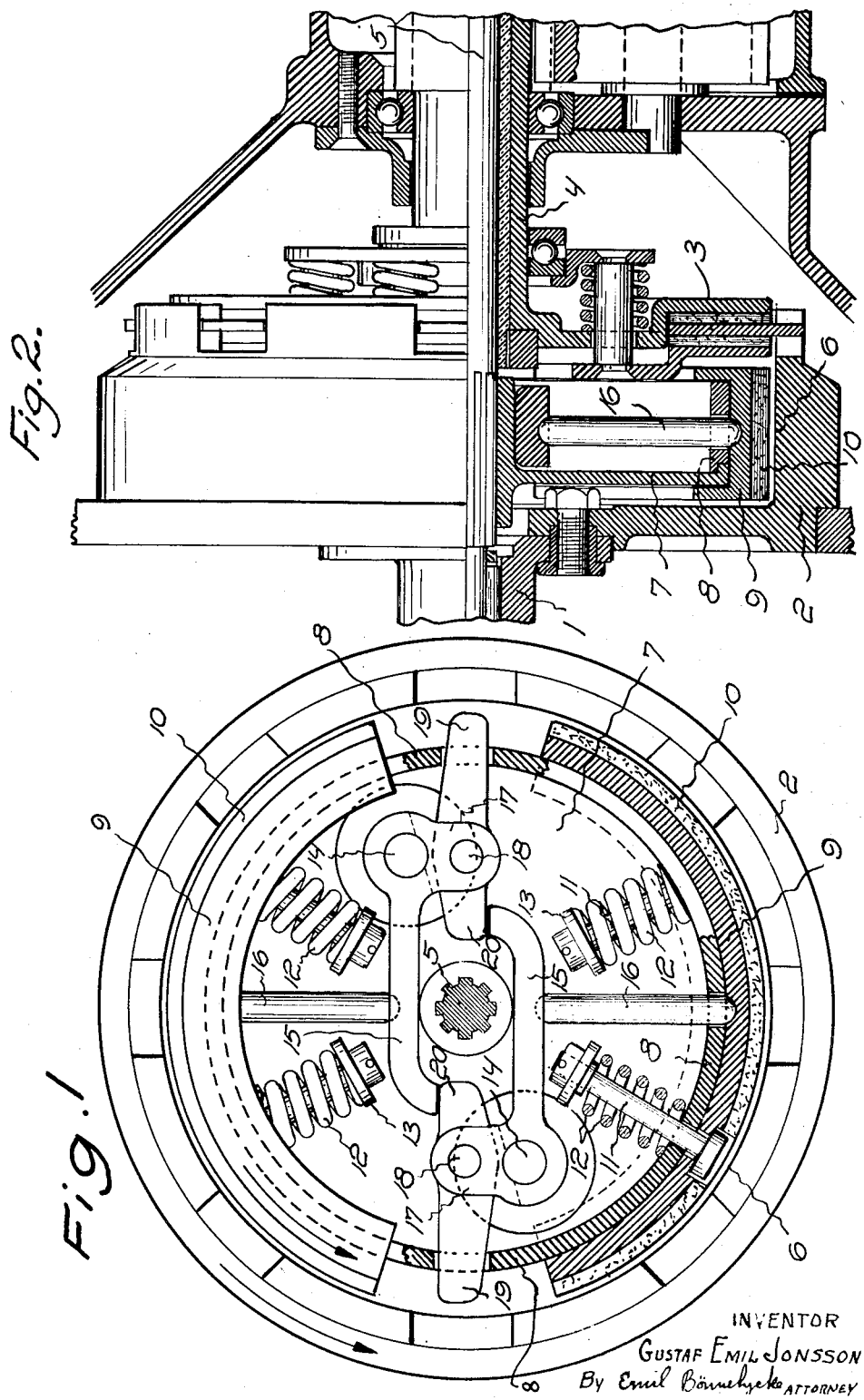
INVENTOR
GUSTAF EMIL JONSSON
By Emil Bönnelycke ATTORNEY Patented Dec. 14, 1937

2,101,946

UNITED STATES PATENT OFFICE 2,101,946

CENTRIFUGAL CLUTCH FOR ROTATING MACHINE ELEMENTS

Gustaf Emil Jonsson, Huddinge, Sweden

Application August 20, 1935, Serial No. 37,068
In Sweden September 11, 1934

2 Claims. (Cl. 192—105)

The present invention refers to an improvement in centrifugal clutches for rotating machine elements.

Centrifugal clutches are frequently used as coupling means between rotating machine elements, for instance machine shafts, and the employment of such clutches has almost exclusively for its purpose to obtain an automatic engagement, or disengagement, of the clutch at certain rotational speeds.

In case of machine elements rotating at a variable speed, it may happen that the value of the speed, during certain and perhaps rather long periods of time, coincides with the speed value at which the clutch is adapted to be engaged, or disengaged. If this speed value is equal both for engagement and for disengagement, the clutch would repeatedly be engaged and disengaged for very small variations of the speed in the proximity of said speed value, and such an action of the clutch would frequently be disturbing for the smooth running of the machine element to be driven by the clutch.

In order to eliminate the inconveniences arising herefrom, the present invention refers to an improvement in centrifugal clutches having for its purpose to provide for the engagement and disengagement, respectively, of the clutch at different speed values, so that an engagement of the clutch is performed at a certain speed value, and a disengagement of the same at another and lower value of the speed, while still securing the automatic clutching action.

By such means, the speed may vary between the two speed values for engagement and disengagement, respectively, without disturbances and without having any influence on the function of the clutch, and by providing for a sufficient margin between the said two speed values the clutch may be adapted for a disturbance-free working under all conditions.

In the following, the invention is to be described by reference to the accompanying drawing which shows an embodiment thereof especially intended for employment in connection with automatically acting change speed gears for motor cars and the like, but naturally the invention is also adaptable in any other connection, and it is not limited to the embodiment shown in the drawing, although the same may be said to refer to one of the most common fields of employment in practice.

In the drawing:—

Fig. 1 shows an end view of the centrifugal clutch proper, the lower half of the same being shown in section, and Fig. 2 is an elevation of the clutch and adjacent constructional parts in a gear box, the lower half part and the box casing as a whole being shown in longitudinal section in the figure.

In order to obtain an easier understanding of the invention it seems advisable to refer to the function to be fulfilled by the embodiment shown, and then it is to be supposed that the centrifugal clutch, at a certain predetermined rotational speed of the driven machine element, has to perform an automatic change between the highest gear, or direct drive, of the gear box in a motor car, and the gear of next lower order ("the second gear") in the same gear box.

In the drawing (Fig. 2), 1 is the driving machine element, or engine shaft, supporting the fly wheel 2, which by means of a common disc clutch 3 stands in coupling relation to a sleeve-shaped shaft 4 adapted to drive the second gear in the gear box, and by means of the latter also to drive the driven machine element, or the Cardan shaft 5.

The driving member of the centrifugal clutch is affixed to the engine shaft 1 and forms a preferably cylindrical friction face 6, which in the embodiment shown is supposed to be formed within the fly wheel 2 itself, although said friction face could also have been provided in another constructional member connected with the driving shaft.

The driven shaft 5 is rigidly connected with a disc-shaped clutch member 7 provided at its outer circumference with a cylindrical ring 8, which is supported by and rotatably mounted in relation to the clutch disc 7. Exteriorly of the ring 8 the clutch disc 7 also supports a number of clutch segments 9 (two—in the drawing) provided at their outer face with the conventional friction lining 10. The clutch segments are U-shaped in cross section (see Fig. 2) and embrace the clutch disc 7 and the ring 8 so as to prevent an axial displacement of the constructional members just referred to.

The clutch segments 9 and the linings 10 thereon are connected with the ring 8 by means of bolts 11 (Fig. 1) preventing a relative circumferential displacement of the segments but permitting a radial displacement of the same, as the bolts are slidable through corresponding bores in the ring 8. The bolts are surrounded by compression springs 12 seated between washers 13 affixed to the inner ends of the corresponding bolts, and the inner face of the ring 8. The washers 13 may be replaced by nuts on the bolt ends, which nuts may be rotated for variation of the strength of the springs.

From the foregoing it will be evident that the centrifugal force will act on the clutch segments 9, 10 upon rotation for forcing said segments into frictional contact with the clutch face 6, and that said force is counteracted by the springs 12. The clutch will be engaged at a rotational speed value sufficient to overcome the spring action, and then the driving shaft 1 will be directly connected with the driven one 5. If the centrifugal clutch is disengaged, the shaft 1 will drive the shaft 5 by the intermediary of the disc clutch 3 and the second gear in the manner stated above.

When the centrifugal clutch is engaged, the second gear may naturally be brought out of action in one manner or another independently of the invention, but it may also remain in action in case at least one of the gear wheels thereof is connected with its shaft by means of uni-directionally acting coupling means which thus permits the lag required in the second gear at the engagement of the direct drive. Such means are well known in the art and independent of the invention.

For each of the clutch segments, the construction also includes a bell crank lever pivotally mounted on a pin 14 affixed to the clutch disc 7 (see Fig. 1), such lever being provided with a longer arm 15 positioned in contact with the inner end of a spacing pin 16, the outer end of which extends freely through a bore in the ring 8 and is seated against the inner face of the corresponding clutch segment 9. The spacing pins 16 are adapted to push the clutch segments outwardly when the lever arms 15 are rocked in a clockwise direction in Fig. 1.

The aforesaid bell crank levers are also provided with shorter arms 17 supporting pivot pins 18 for two-armed levers 19, 20, one arm 19 of which extends radially through a corresponding slot in the ring 8, whereas the other arm 20 is in contact with the free end of the lever arm 15 belonging to the opposite clutch segment mechanism. The slots in the ring 8 penetrated by the lever arms 19 form abutments for turning of said lever arms when the ring is rotated in relation to the clutch disc 7 to which the pivots 14 are affixed. All of the levers move in a plane substantially parallel with said disc.

It will be understood from above that when the levers 19, 20 are rocked counter-clockwise in Fig. 1, the lever arms 15 will be rocked clockwise and caused to act upon the spacing pins 16 for compression of the springs 12. The ends of the spacing pins 16 are rounded off so as to permit a little tilting movement of the same, and the bores in the ring 8 penetrated by said pins are somewhat wider than the diameter of the pins for the same purpose.

If supposing a direction of rotation as indicated by arrows in Fig 1, the function of the construction will be as follows:—

The second gear drives the Cardan shaft 5 by means of the disc clutch 3 as described above, and with a certain speed which is smaller than the speed of the engine shaft 1, but when the speed of the first mentioned shaft, during a continued acceleration, assumes a certain predetermined value, the centrifugal force acting on the clutch segments 9, 10 will overcome the strength of the springs 12 so that the segments are thrown out and come into frictional engagement with the clutch face 6 whereby they tend to assume the higher rotational speed of the latter. This cannot be performed instantaneously, however, due to inertia and to the somewhat resilient engagement between the clutch members, and at the beginning the clutch segments will lag behind to a certain extent. This results in a turning movement of the clutch segments in a direction opposite to the direction of rotation in relation to the clutch face 6, but in relation to the disc 7 the segments will be turned in the direction of rotation, the latter turning movement being of consequence for the function only.

When the said segments are thus turned in relation to the clutch disc 7, the ring 8 by means of the bolts 11 is similarily turned in relation to the disc, and then the levers 19, 20 are rocked counter-clockwise in Fig. 1 and cause the lever arms 15 to be rocked clockwise. The lever arms 15 actuate the distance pins 16 and exert an additional outward pressure on the segments 9, so that the total outward force acting on said segments after their engagement with the surface 6 is the sum of the pressure produced by the centrifugal force and that of the pins 16.

It is apparent, therefore, that a lower degree of centrifugal force acting in conjunction with the force of the pins 16 will be sufficient to maintain the engagement between the segments 9 and the surface 6. This means that if the speed of the Cardan shaft is again lower disengagement between the elements 9 and 6 will occur at a rotational speed below that at which engagement took place.

It will be evident without further explanations that it is freely open to determine the different speeds at which the engagement and disengagement, respectively, is to be performed, and the interval between them, by variation of the weight of the clutch segments 9, 10 and of the strength of the springs. The said conditions stand also in direct dependence of the leverage between the arms of the levers 19, 20 and by variation of said leverage it will also be possible to vary the speed values for engagement and disengagement.

It is evident that the invention in practice may be constructed materially different from the embodiment described above for the sake of explanation, while still maintaining the function of the same. The number of clutch segments may be greater than two, but an even number thereof is preferably to be employed, as the segments are intended to coact in pairs in the manner described, in order to counterbalance the rotating masses. The lever means employed may also be constructed in a plurality of other ways than the single one described above and shown in the drawing. Furthermore, the number of springs acting on each segment is also irrelevant and one spring may suffice for the purpose if properly mounted in relation to the other constructional parts.

What I claim and desire to secure by Letters Patent is:—

1. In a centrifugal clutch for rotating machine elements, a first clutch member comprising a disc affixed to one of the machine elements, a supporting ring turnably mounted on said disc, a number of clutch segments mounted exteriorly on said ring and radially displaceable in relation thereto, spring means acting on the clutch segments and adapted to displace the same inwardly towards the outer face of said ring in counteraction of the centrifugal force, a number of two-armed levers supported by said disc, one arm of each lever extending through an opening in said ring, the other arm being adapted by suitable intermediate means to exert an outward force on a clutch segment when the ring is rotated relatively to the disc, and a second clutch member affixed to the other machine element and provided with a clutch surface for frictional engagement with the clutch segments.

2. In a centrifugal clutch for rotating machine elements, a first clutch member comprising a disc affixed to one of the machine elements, a supporting ring turnably mounted on said disc, a number of clutch segments mounted exteriorly on said ring and radially displaceable in relation thereto, spring means acting on the clutch segments and adapted to displace the same inwardly towards the outer face of said ring in counteraction of the centrifugal force, a bell crank lever for each of the clutch segments pivotally mounted on the clutch member disc and provided with a lever arm adapted by suitable intermediate means to actuate the corresponding clutch segment and with another arm supporting a pivotally mounted two-armed lever one arm of which is adapted to act upon the bell crank lever belonging to another clutch segment, whereas the other arm extends through an opening in said ring, and a second clutch member affixed to the other machine element and provided with a clutch surface for frictional engagement with the clutch segments.

GUSTAF EMIL JONSSON.